July 13, 1948.   W. P. BAMFORD ET AL   2,444,972
APPARATUS FOR TEMPERING GLASS SHEETS OR PLATES
Filed March 30, 1942   2 Sheets-Sheet 1

Inventors
WILLIAM P. BAMFORD,
JOHN D. HEMLEY.
By Frank Fraser
Attorney

July 13, 1948. W. P. BAMFORD ET AL 2,444,972
APPARATUS FOR TEMPERING GLASS SHEETS OR PLATES
Filed March 30, 1942 2 Sheets-Sheet 2

Inventors
WILLIAM P. BAMFORD.
JOHN D. HEMLEY.
By Frank Frouer
Attorney

Patented July 13, 1948

2,444,972

UNITED STATES PATENT OFFICE 2,444,972

APPARATUS FOR TEMPERING GLASS SHEETS OR PLATES

William P. Bamford, Maumee, and John D. Hemley, Toledo, Ohio, assignors to Libbey-Owens-Ford Glass Company, Toledo, Ohio, a corporation of Ohio Application March 30, 1942, Serial No. 436,758

4 Claims. (Cl. 49—45)

The present invention relates to an improved apparatus for the tempering of glass sheets or plates.

In the tempering of glass sheets according to one known process, the sheet is maintained in a vertical position during the treatment thereof by suspending the same from a pair of relatively small tongs or hooks which engage opposite faces of the sheet near its upper edge. The glass sheet is heated to a point approximating softness and then suddenly chilled by exposure to jets or blasts of air to place the outer surfaces of the sheet under compression and the interior thereof under tension. The supporting of the sheet in this manner is, however, open to objection due to the fact that when the glass is heated, the tongs or hooks bite into the softened sheet causing slight indentations, depressions, and distortion in the area around these points, and which are quite noticeable after tempering. Another disadvantage in the use of tongs is that it is difficult to temper thin or bent or curved sheets, supported in this manner, without causing warpage or a change in the shape or contour thereof.

The tempering of glass sheets in accordance with the above process greatly increases the strength of the glass and its resistance to fracture and thermal shock. Because of its increased strength, thinner glass may be employed in the manufacture of laminated safety glass, which ordinarily comprises two sheets of plate or window glass and an interposed layer of thermoplastic adherent thereto.

By proper regulation and control of the time, temperature, and air-cooling cycle, the glass sheets can be either fully tempered or partially tempered, as desired, and this invention is equally applicable to both of these processes. As is well known, fully tempered glass sheets will, upon fracture, disintegrate into innumerable particles of granular form and, if embodied in a sheet of laminated safety glass, will render the laminated sheet practically non-transparent. This is obviously highly objectional. On the other hand, if a glass sheet is only partially tempered, the tensile strength of the glass and its resistance to thermal shock will be materially increased and, upon being fractured, will not be reduced to a granular condition so that if embodied in a sheet of laminated safety glass vision through the safety glass is not seriously impaired.

While this invention can be used in either the complete or partial tempering of both flat and bent sheets of glass, it has been found extremely satisfactory when employed in the partial or semi-tempering of curved or bent sheets. In the semi-tempering of bent or curved sheets of glass which are to be subsequently laminated with an interposed layer of thermoplastic to form safety glass, it is essential that the surfaces of the glass sheets are not marred or the sheets changed in shape or contour by the tempering treatement. The glass sheets are usually first bent to the desired curvature, then cut to size, and the edges thereof ground and polished before being tempered. This procedure is desirable due to the risk or possibility of the glass fracturing if the cutting or edging is done after tempering. It is for this reason that the shape or contour of the glass sheets must not be adversely affected by tempering, since, if this occurs, the sheets will not properly match one another when laminated with a layer of plastic material to form safety glass. In order to insure that the glass sheets will properly match one another, it is customary for them to be bent in pairs, and therefore the importance of preventing distortion, warpage, or buckling of the sheets during tempering cannot be too strongly emphasized. This is particularly true, since the spoiling of one sheet of a pair of bent sheets during tempering may result in the necessity for discarding the matching sheet.

It is a primary aim and object of this invention to provide an improved apparatus for tempering glass sheets whereby danger of warpage, distortion, or change of contour thereof during tempering will be reduced to a minimum if not entirely eliminated Another object of the invention is the provision of an improved apparatus for tempering glass sheets wherein the sheet is freely supported on edge in an inclined position in such a manner as to overcome any tendency of the sheet to sag or warp during tempering, while at the same time being permitted to expand and contract in its own plane.

A further object of the invention is the provision of novel means for supporting the glass sheets in such a manner that the glass will not be marred or defaced thereby during the tempering operations.

A still further object of the invention is the provision of novel means in the form of a ceramic mold for freely supporting the glass sheet in a substantially vertical position and so constructed that it will not interfere with the heating and cooling of the sheet.

Other objects and advantages of the invention will become more apparent during the course of the following description, when taken in connection with the accompanying drawings.

In the drawings, wherein like numerals are employed to designate like parts throughout the same:

Figure 1:
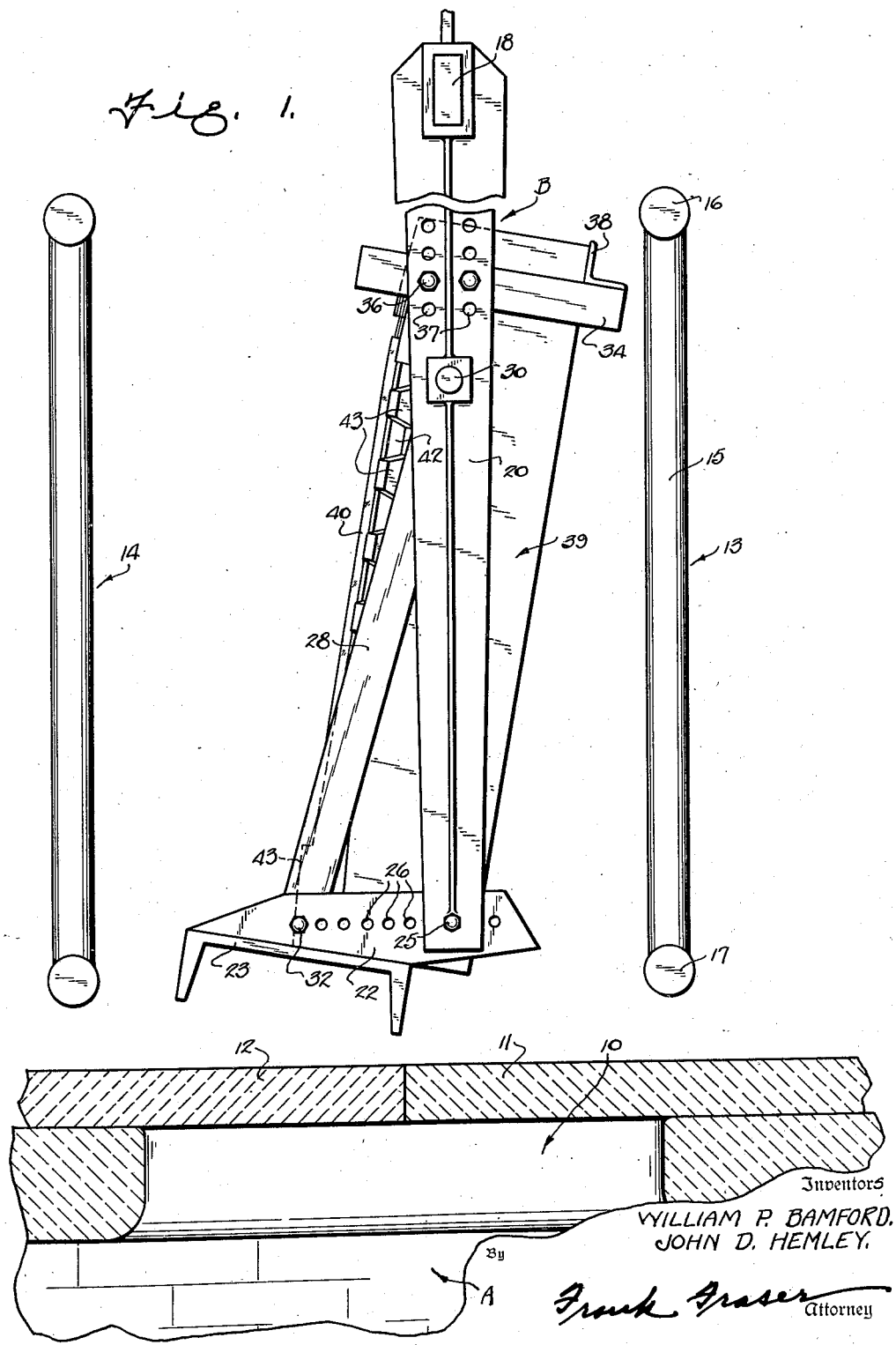
Fig. 1 is a side elevation of apparatus provided by the invention for use in the tempering of glass sheets or plates.
Figure 2:
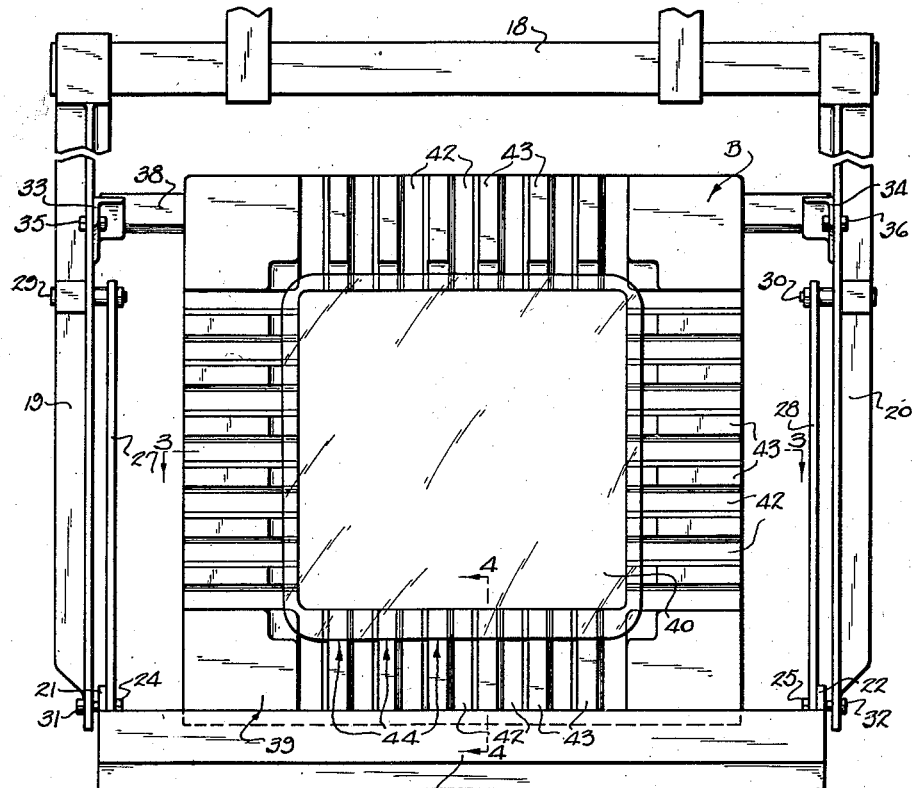
Fig. 2 is a front view thereof.
Figure 3:
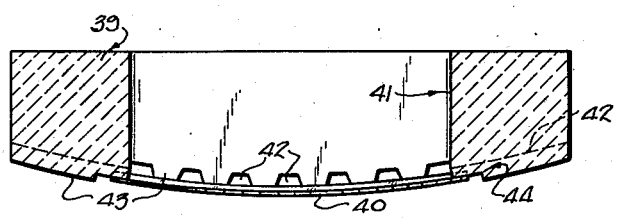
Fig. 3 is a horizontal section taken substantially on line 3—3 of Fig. 2.
Figure 4:
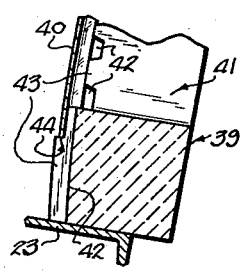
Fig. 4 is a detail vertical section taken substantially on line 4—4 of Fig. 2.

In the embodiment of the invention illustrated in the drawings, the means for heating the glass sheets comprises a furnace designated in its entirety by the letter A and being of any conventional or preferred construction. As here shown, however, the furnace is provided in the top thereof with an opening 10 through which the improved supporting means B for the glass sheets to be treated may be alternately lowered into the furnace and lifted therefrom. The furnace top opening 10 may be normally closed by removable cover plates 11 and 12.

Mounted above the furnace A is the cooling means comprising a pair of spaced blower heads 13 and 14 disposed at opposite sides of the glass supporting means B when said supporting means is in raised position. The blower heads 13 and 14 may also be of any conventional or preferred type. For instance, they may consist of a plurality of spaced vertical pipes 15 connected together at their upper and lower ends by transverse air supply pipes 16 and 17. The vertical pipes 15 are provided longitudinally thereof with a series of relatively small openings through which jets or blasts of air can be directed against opposite surfaces of the sheet in the manner well known in the art.

The glass supporting means B comprises a rack including a horizontal supporting bar 18 having secured to the opposite ends thereof the depending arms 19 and 20. Carried at the lower ends of the arms 19 and 20 are the forwardly directed, substantially horizontal plates 21 and 22 respectively. Extending between and secured to the plates 21 and 22 is a channel member 23. The plates 21 and 22 are pivotally mounted upon the arms 19 and 20 respectively by bolts or the like 24 and 25 carried by said arms and passing through openings 26 in said plates.

Also carried by the depending arms 19 and 20 are link bars 27 and 28 pivotally mounted upon said arms adjacent their upper ends by pins or the like 29 and 30 respectively and pivotally connected at their lower ends to the plates 21 and 22 by bolts or the like 31 and 32 which also pass through the openings 26 in said plates. The link bars 27 and 28 serve to maintain the channel member 23 at the desired angle and the angle of inclination thereof may be varied by inserting the bolts 24 and 25 carried by arms 19 and 20 through the desired openings 26 in plates 21 and 22.

Carried adjacent the upper ends of the depending arms 19 and 20 are the transverse angle irons 33 and 34 secured to said arms by bolts or the like 35 and 36 passing through openings 37 therein. Extending between and secured to the angle irons 33 and 34 is an angle bar 38.

Supported upon the channel member 23 is a mold 39 for directly carrying the glass sheet 40 to be tempered, the upper end of said mold resting against the angle bar 38. The mold 39 is adapted to freely support the glass sheet 40 at its lower edge in an inclined position in such a manner that the tendency of the sheet to sag, warp, or lose its shape or contour upon heating and cooling thereof is reduced to a minimum. At the same time, the mold permits the sheet to expand and contract in its own plane during the heating and subsequent cooling operations.

The mold 39 is preferably formed from a ceramic composition which can be cast to the desired shape and size to provide a smooth, relatively soft surface free from defects which might tend to mar the glass and having sufficient refractoriness so that it will effectively withstand the heat to which it is subjected with a minimum of cracking or disintegration. The mold should also preferably be of such character that the surface thereof can be cut or sanded for radii and surface corrections. Although the invention is not limited to the use of a ceramic mold of any specific composition, one composition which has been found to possess the above desirable characteristics and which has also proven satisfactory in actual use is as follows:

| | Per cent by weight |
|---|---|
| High alumina cement (calcium aluminate) | 35 |
| Pottery plaster | 12 |
| Aggregate: | |
|    Calcined diatomaceous earth | 42 |
|    Fibrous talc | 11 |
|       Total aggregate | 53 |

The particular composition of the mold set forth above does not constitute a part of the present invention per se.

The type of mold 39 herein shown is in the form of an open frame having the central portion thereof cut out as indicated at 41. The front or supporting face of the mold is also accurately shaped to conform to the shape of the glass sheet 40 to be carried thereby. For instance, if the glass sheet to be tempered is flat, the front face of the mold is also flat, whereas if a curved sheet is to be treated, the front face of the mold will have a curvature corresponding to the curvature of the sheet.

As pointed out above, the mold 39 is supported on edge upon the channel member 23 and will be disposed in an inclined position, with the upper end thereof resting against the angle bar 38. The angle of inclination of the front face of the mold will depend upon the angle at which the channel member 23 is set. To provide for the supporting of the glass sheet 40 directly upon the mold 39, the said mold is provided in the front face thereof with a plurality of transverse notches 42 which result in spaced parallel ribs 43. These ribs are in turn cut away or notched at their inner ends as at 44 to provide a recessed portion in the front face of the mold for receiving the glass sheet, said sheet being supported upon the ledge formed by the parallel ribs 43 at the bottom of the mold.

The glass sheet 40, after being placed upon the mold 39, is lowered into the furnace A and heated to the desired temperature, whereupon it is lifted therefrom and, while still supported upon said mold, is subjected to jets or blasts of air from the blower heads 13 and 14. By freely supporting the glass sheet on edge in an inclined position in the manner herein disclosed, the sheet can be subjected to the heating and cooling operations without danger of the said sheet being accidentally displaced from the mold. In addition, the mold is of such character that it will not interfere with the proper heating and cooling of the sheet. In this connection, the provision of the notches 42 are of advantage in that they provide openings which permit the air to escape from in back of the sheet. Of course, the escape of the air from in back of the sheet can be effected in other ways, such as by drilling holes through the sides of the mold, and, in addition, molds of different shapes and design may be employed including concave molds as well as convex molds. When tempering bent sheets of glass, the front face of the mold will have a curvature corresponding to the desired radius of the glass sheet. Thus, it has been found that in those cases where the sheet is not accurately shaped, this error may be reduced or eliminated in the subsequent heating and cooling operations due to the manner in which the said sheet is carried by the mold.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

We claim:

1. An apparatus for supporting a glass sheet during tempering, comprising a mold member having a front face inclined to the vertical, said front face being provided with transverse notches at least some of which are substantially vertical resulting in spaced ribs, said ribs being partially cut away to provide a recessed portion in the front face of said mold member for receiving the sheet therein, and maintaining said sheet freely supported at its lower edge upon the ribs at the bottom of the mold member and resting freely against the inclined front face thereof.

2. An apparatus for supporting a glass sheet during tempering, comprising a ceramic mold member having a smooth relatively soft front face inclined to the vertical, said front face being provided with transverse notches at least some of which are vertical resulting in spaced ribs, said ribs being partially cut away to provide a recessed portion in the front face of said mold member for receiving the sheet therein, and maintaining said sheet freely supported at its lower edge upon the ribs at the bottom of the mold member and resting freely against the inclined front face thereof, the front face of said mold member being also shaped to correspond to the form of said sheet.

3. An apparatus for supporting a glass sheet during tempering, comprising a mold member means for supporting said mold member with its front face inclined to the vertical, said mold member being adapted for freely supporting the sheet on edge and having a cut out center portion resulting in a frame having a front face inclined to the vertical, said front face being provided with transverse notches resulting in spaced ribs against which the marginal portions of the sheet freely rest and recesses cut in said ribs on which the edge of the sheet is supported, the front face of said frame being also shaped to correspond to the form of said sheet.

4. An apparatus for supporting a glass sheet during tempering, comprising a ceramic mold member means for supporting said mold member with its front face inclined to the vertical, said mold member having a cut out center portion resulting in a frame having a smooth relatively soft front face inclined to the vertical, said front face being provided with transverse notches resulting in spaced ribs, said ribs being partially cut away to provide a recessed portion in the front face of said frame for receiving the sheet therein, and maintaining said sheet freely supported at its lower edge upon the ribs at the bottom of the frame and resting freely against the inclined front face thereof, the front face of said frame being also shaped to correspond to the form of said sheet.

WILLIAM P. BAMFORD.
JOHN D. HEMLEY.

REFERENCES CITED

The following references are of record in the file of this patent:

UNITED STATES PATENTS

| Number | Name | Date |
| --- | --- | --- |
| 1,613,276 | Hill | Jan. 4, 1927 |
| 1,889,881 | Thompson | Dec. 6, 1932 |
| 2,009,431 | Black | July 30, 1935 |
| 2,019,595 | Black | Nov. 5, 1935 |
| 2,146,390 | White | Feb. 7, 1939 |
| 2,194,730 | Wilson | Mar. 26, 1940 |
| 2,235,969 | White | Mar. 25, 1941 |
| 2,259,727 | Bowers | Oct. 21, 1941 |
| 2,270,186 | Dulmage | Jan. 13, 1942 |
| 2,348,278 | Boyles | May 9, 1944 |

FOREIGN PATENTS

| Number | Country | Date |
| --- | --- | --- |
| 1,599 | Great Britain | 1902 |